United States Patent
Fujiki et al.

(10) Patent No.: US 10,864,915 B2
(45) Date of Patent: Dec. 15, 2020

(54) PASSING ASSIST DEVICE

(71) Applicant: DENSO CORPORATION, Kariya (JP)

(72) Inventors: Koji Fujiki, Kariya (JP); Hiroaki Niino, Kariya (JP); Shotaro Fukuda, Kariya (JP)

(73) Assignee: DENSO CORPORATION, Kariya (JP)

( * ) Notice: Subject to any disclaimer, the term of this patent is extended or adjusted under 35 U.S.C. 154(b) by 157 days.

(21) Appl. No.: 16/074,270

(22) PCT Filed: Feb. 2, 2017

(86) PCT No.: PCT/JP2017/003781
§ 371 (c)(1),
(2) Date: Jul. 31, 2018

(87) PCT Pub. No.: WO2017/135369
PCT Pub. Date: Aug. 10, 2017

(65) Prior Publication Data
US 2020/0139972 A1 May 7, 2020

(30) Foreign Application Priority Data
Feb. 2, 2016 (JP) .................................. 2016-018113

(51) Int. Cl.
*B60W 30/18* (2012.01)
*B60W 10/04* (2006.01)
*B60W 10/20* (2006.01)
*B60W 50/14* (2020.01)
*G08G 1/052* (2006.01)

(52) U.S. Cl.
CPC ...... *B60W 30/18163* (2013.01); *B60W 10/04* (2013.01); *B60W 10/20* (2013.01); *B60W 50/14* (2013.01); *G08G 1/052* (2013.01); *B60W 2520/10* (2013.01); *B60W 2554/4041* (2020.02); *B60W 2710/20* (2013.01); *B60W 2720/106* (2013.01)

(58) Field of Classification Search
CPC ........... B60W 30/18163; B60W 10/04; B60W 50/14; B60W 10/20; B60W 2520/10; B60W 2710/20; B60W 2720/106; B60W 2554/4041; G08G 1/052
See application file for complete search history.

(56) References Cited

U.S. PATENT DOCUMENTS

2006/0217866 A1 9/2006 Moebus
2016/0129919 A1* 5/2016 Kubo ..................... G08G 1/167
340/441

FOREIGN PATENT DOCUMENTS

| JP | H6-135259 A | 5/1994 |
| JP | 2006-513903 A | 4/2006 |
| JP | 2008-094111 A | 4/2008 |
| JP | 2012-001042 A | 1/2012 |
| WO | 2014/203333 A1 | 12/2014 |

* cited by examiner

Primary Examiner — Yuen Wong
(74) Attorney, Agent, or Firm — Maschoff Brennan

(57) ABSTRACT

A passing assist device includes a detection unit, a passing control unit, a speed setting unit, and a suspending unit. When the speed of an own vehicle set by the speed setting unit is lower than a preset speed when the own vehicle is traveling in a passing lane, the suspending unit suspends a lane change from the passing lane to a traveling lane by the passing control unit.

6 Claims, 9 Drawing Sheets

PASSING ASSIST DEVICE

CROSS-REFERENCE TO RELATED APPLICATION

This application is the U.S. national phase of International Application No. PCT/JP2017/003781 filed Feb. 2, 2017 which designated the U.S. and claims priority to Japanese Patent Application No. 2016-18113 filed Feb. 2, 2016, the entire contents of which are hereby incorporated by reference.

TECHNICAL FIELD

The present disclosure relates to a passing assist device.

BACKGROUND ART

PTL 1 listed below discloses a traveling assist device that assists in changing lanes. The traveling assist device sets a vehicle traveling track for changing a lane to an adjacent lane. The traveling assist device then changes the lane by controlling a steering mechanism based on the set traveling track.

CITATION LIST

Patent Literature

[PTL 1] JP 2008-94111 A

SUMMARY OF THE INVENTION

There is a possible passing assist device as described below. While an own vehicle with a passing assist device is traveling in a traveling lane, when another vehicle X ahead of the own vehicle is detected in the traveling lane, the passing assist device controls a steering unit of the own vehicle to change a lane from the traveling lane to a passing lane.

The passing assist device then accelerates the own vehicle to pass the other vehicle X. Finally, the passing assist device changes a lane from the passing lane to the traveling lane.

However, the inventor's detailed study has discovered a problem as described below with the passing assist device. It is conceivable that a preceding vehicle Y is traveling at a low speed ahead of the own vehicle in the passing lane. In this case, if the own vehicle passes the other vehicle X and then changes the lane from the passing lane to the traveling lane, the own vehicle in the traveling lane passes the preceding vehicle Y which is in the passing lane. This can be equivalent to a breach of traffic rules.

An aspect of the present disclosure is preferably to provide a passing assist device that can prevent the own vehicle from causing a breach of traffic rules.

An aspect of the present disclosure is a passing assist device that includes: a detection unit configured to, when an own vehicle is traveling in a traveling lane, detect another vehicle X ahead of the own vehicle in the traveling lane; and a passing control unit configured to control a steering unit and a drive unit of the own vehicle to change a lane from the traveling lane to a passing lane, pass the other vehicle X detected by the detection unit, and change a lane from the passing lane to the traveling lane.

The passing assist device further includes: a speed setting unit configured to set the speed of the own vehicle traveling in the passing lane to the lower one of a preset speed and the speed of a preceding vehicle Y in the passing lane; and a suspending unit configured to, when the speed of the own vehicle set by the speed setting unit is lower than the preset speed while the own vehicle is traveling in the passing lane, suspend the lane change from the passing lane to the traveling lane by the passing control unit.

According to the passing assist device, it is possible to prevent a situation where, after passing the other vehicle X, the own vehicle in the traveling lane passes the preceding vehicle Y in the passing lane. As a result, it is possible to prevent the own vehicle from causing a breach of traffic rules.

DESCRIPTION OF EMBODIMENTS

Embodiments of the present disclosure will be described with reference to the drawings.

First Embodiment

1. Configuration of a Passing Assist Device 1

A configuration of the passing assist device 1 will be described with reference to FIGS. 1 and 2. The passing assist device 1 is an in-vehicle device mounted in a vehicle. Hereinafter, a vehicle equipped with the passing assist device 1 will be referred to as an own vehicle.

The passing assist device 1 includes a microcomputer that has a CPU 3 and a semiconductor memory such as RAM, ROM, or flash memory (hereinafter, referred to as a memory 5). Various functions of the passing assist device 1 are implemented by the CPU 3 executing programs stored in a non-transitory computer readable storage medium. In this example, the memory 5 is equivalent to the non-transitory computer readable storage medium storing the programs. When any of the programs is executed, a method corresponding to the program is executed. The passing assist device 1 may include one or more microcomputers.

Figure 2:
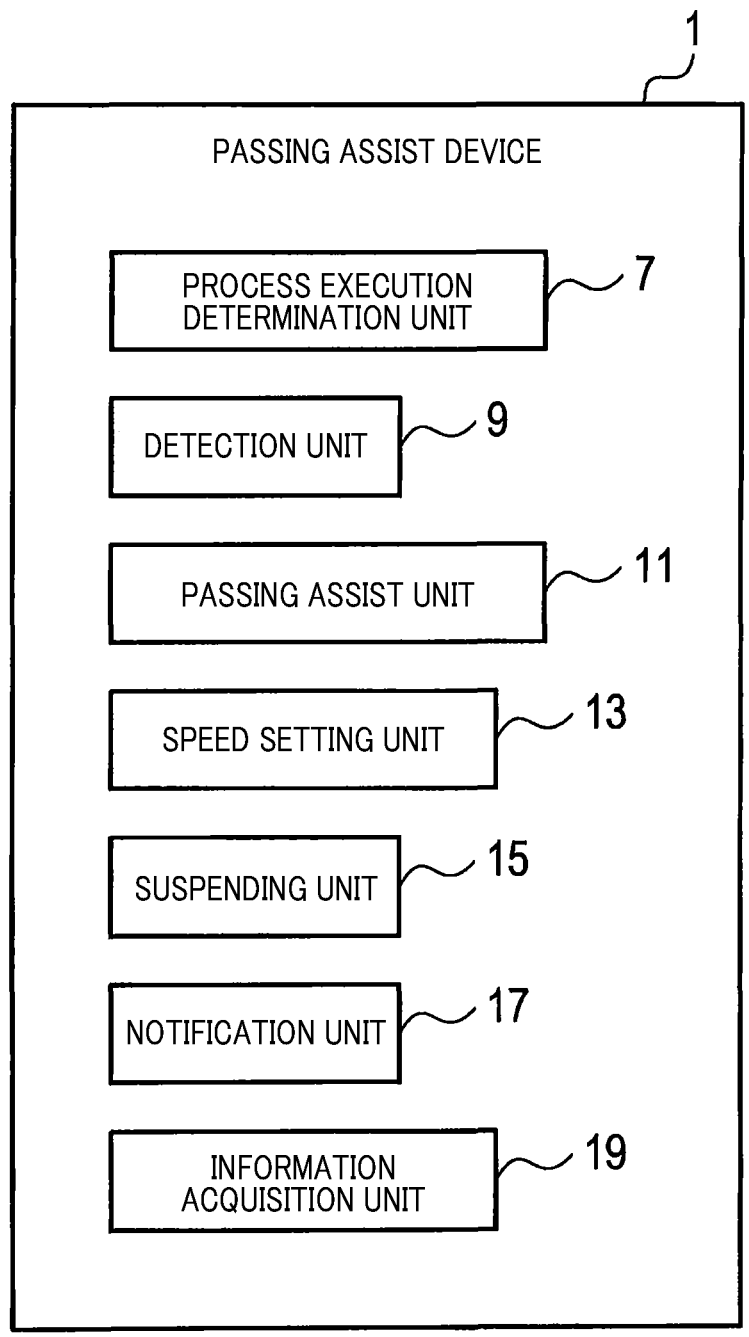
FIG. 2 is a block diagram illustrating a functional configuration of the passing assist device.

As functional components implemented by the CPU 3 executing the programs, as shown in FIG. 2, the passing assist device 1 includes a process execution determination unit 7, a detection unit 9, a passing control unit 11, a speed setting unit 13, a suspending unit 15, a notification unit 17, and an information acquisition unit 19.

The methods for implementing these elements included in the passing assist device 1 are not limited to software but some or all of the elements may be implemented by hardware with a combination of a logical circuit and an analog circuit.

Figure 1:
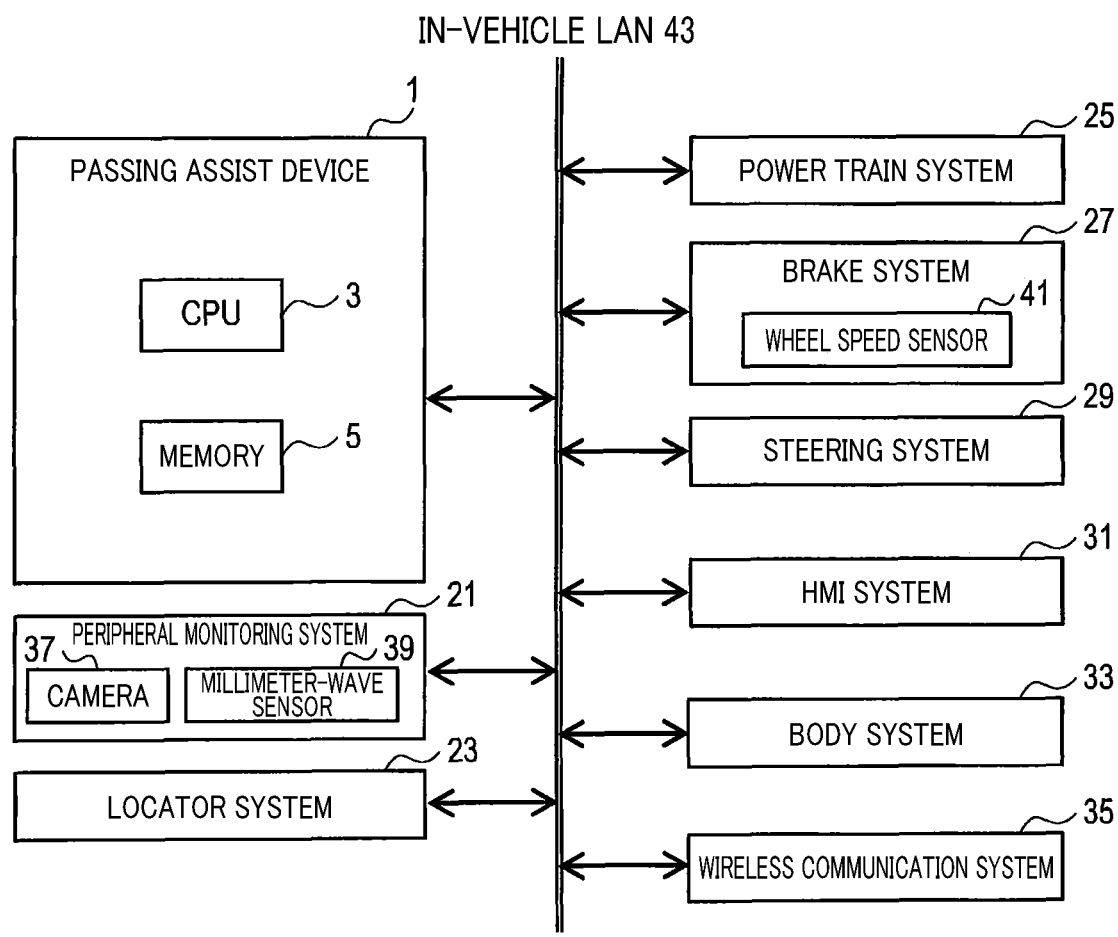
FIG. 1 is a block diagram illustrating a passing assist device and its related configuration.

As illustrated in FIG. 1, besides the passing assist device 1, the own vehicle includes a peripheral monitoring system 21, a locator system 23, a power train system 25, a brake system 27, a steering system 29, an HMI system 31, a body system 33, and a wireless communication system 35. HMI stands for a human-machine interface.

The peripheral monitoring system 21 includes a camera 37 and a sensor such as a millimeter-wave sensor 39. The camera 37 and the sensor such as the millimeter-wave sensor 39 can detect positions and speeds of other vehicles. The peripheral monitoring system 21 sends detection results detected by the sensor to the passing assist device 1.

The locator system 23 includes a GPS and a storage unit that stores map information. The map information includes general elements of the map information and information about lane width and others. The locator system 23 has a function of acquiring information about a position of the own vehicle. The locator system 23 sends the information about the position of the own vehicle to the passing assist device 1.

The power train system 25 has a function of controlling a power train of the own vehicle. The brake system 27 has a function of operating brakes of the own vehicle. The brake system 27 includes a wheel speed sensor 41. The wheel speed sensor 41 detects the rotating speed of wheels of the own vehicle as a signal. The brake system 27 sends the detection signal from the wheel speed sensor 41 to the passing assist device 1. The steering system 29 has a function of steering the own vehicle.

The HMI system 31 accepts operations by the passenger in the own vehicle. The HMI system 31 provides various kinds of information regarding the own vehicle to the passenger in the own vehicle. The information provided by the HMI system 31 includes a notification that a lane change from a passing lane 49 to a traveling lane 47 will not be performed as described later.

The body system 33 has functions of performing door lock control, light control, and turn signal control of the own vehicle, and making notifications of turn signal status to the own vehicle. The wireless communication system 35 has functions of vehicle-to-vehicle communications and vehicle-to-infrastructure communications.

The passing assist device 1, the peripheral monitoring system 21, the locator system 23, the power train system 25, the brake system 27, the steering system 29, the HMI system 31, the body system 33, and the wireless communication system 35 (hereinafter, called constituent elements) are connected to one another by a wireless LAN 43. The constituent elements can transmit and receive information via the wireless LAN 43.

The steering system 29 corresponds to a steering unit. The power train system 25 corresponds to a drive unit.

2. Passing Assist Process Executed by the Passing Assist Device 1.

Figure 3:
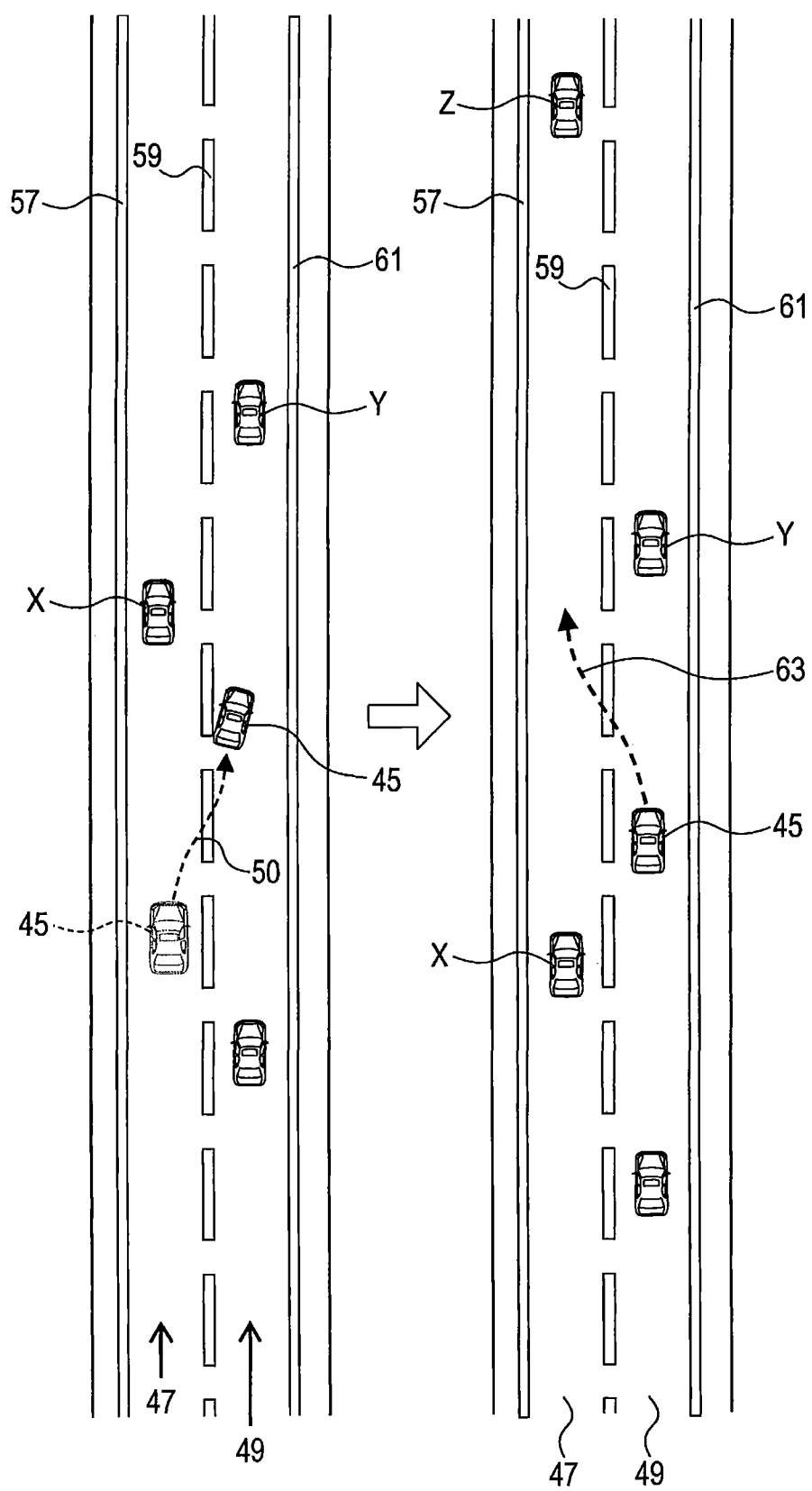
FIG. 3 is an explanatory diagram illustrating an example of passing by the passing assist device.
Figure 4:
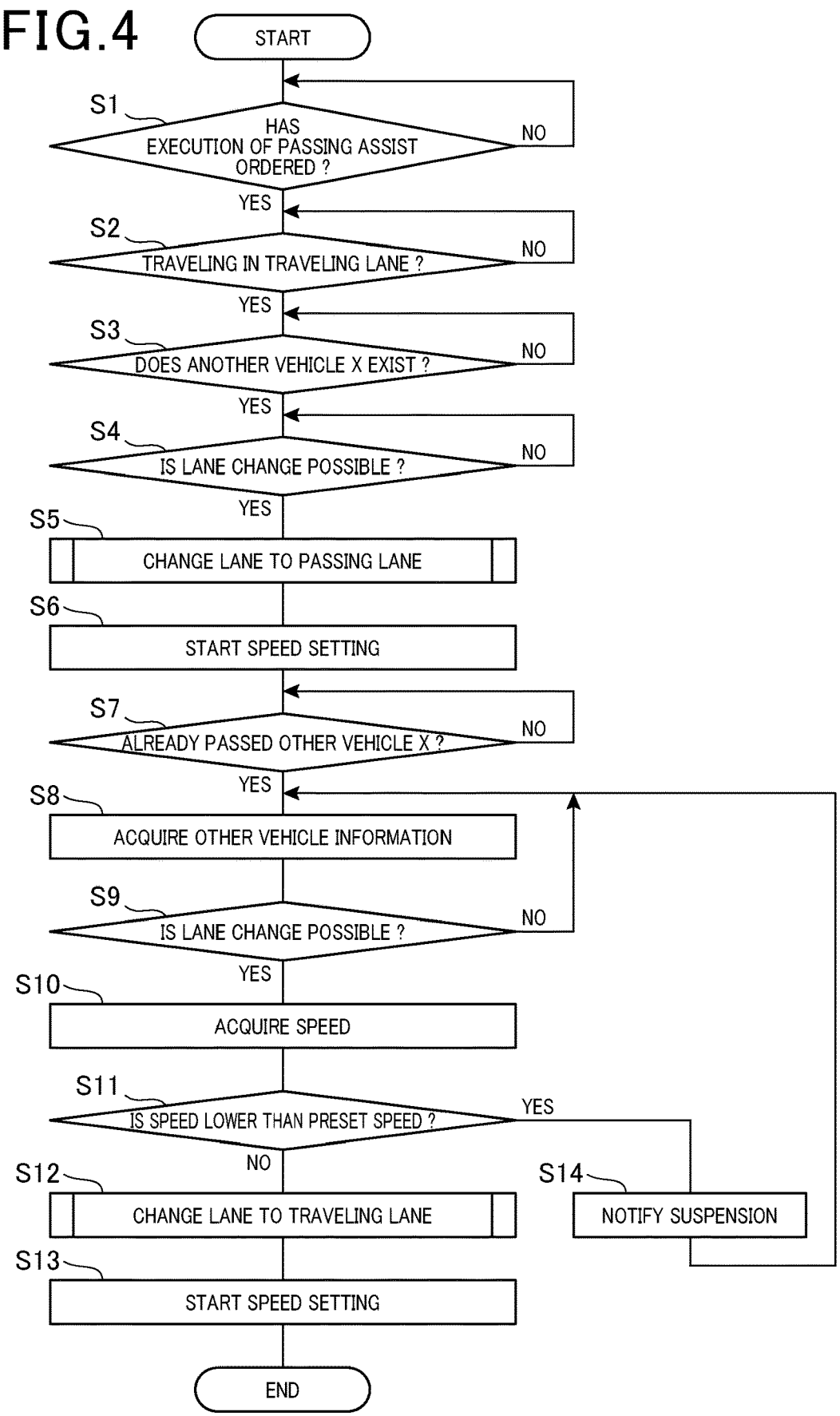
FIG. 4 is a flowchart of a passing assist process performed by the passing assist device.

The passing assist device 1 performs a process for assisting the own vehicle in passing another vehicle (hereinafter, called passing assist process). FIG. 3 illustrates an example of passing executed by the passing assist process.

An own vehicle 45 is initially traveling in a traveling lane 47 with another vehicle X ahead of the own vehicle 45. The own vehicle 45 changes a lane from the traveling lane 47 to a passing lane 49. The own vehicle 45 travels in the passing lane 49 and passes the other vehicle X. Then, the own vehicle 45 changes a lane from the passing lane 49 to the traveling lane 47.

The passing assist process will be described with reference to FIGS. 3 to 9. In step 1 of FIG. 4, the process execution determination unit 7 determines whether execution of the passing assist process has been instructed.

When the passenger in the own vehicle 45 has performed an operation for ordering the HMI system 31 to execute the passing assist process, the process execution determination unit 7 determines that execution of the passing assist process has been instructed and the process proceeds to step 2.

On the other hand, when the passenger in the own vehicle 45 has not yet performed the foregoing operation, the process execution determination unit 7 determines that no execution of the passing assist process has been instructed and then returns to step 1.

In step 2, the detection unit 9 acquires an image using the camera 37. Then, the detection unit 9 uses the acquired image to recognize the lane in which the own vehicle 45 is traveling. The detection unit 9 then determines whether the own vehicle 45 is traveling in the traveling lane 47. When the own vehicle 45 is traveling in the traveling lane 47, the detection unit 9 proceeds to step 3, or when the own vehicle 45 is not traveling in the traveling lane 47, the detection unit 9 returns to step 2.

In step 3, the detection unit 9 uses the image acquired in step 2 to determine whether there exists another vehicle X ahead of the own vehicle 45. The detection unit 9 may use the results of detection by the millimeter-wave sensor 39 to determine whether there exists the other vehicle X ahead of the own vehicle 45. When the other vehicle X exists ahead of the own vehicle 45, the detection unit 9 proceeds to step 4, or when no other vehicle X exists ahead of the own vehicle 45, the detection unit 9 returns to step 3.

In step 4, the passing control unit 11 uses the camera 37 and the millimeter-wave sensor 39 to detect a preceding vehicle Y traveling in the passing lane 49. When the preceding vehicle Y is not detected or when a position of the detected preceding vehicle Y is sufficiently distant from the own vehicle 45, the passing control unit 11 determines that the lane change from the traveling lane 47 to the passing lane 49 is possible and the process proceeds to step S5.

On the other hand, when the position of the detected preceding vehicle Y is not sufficiently distant from the own vehicle 45, the passing control unit 11 determines that the lane change from the traveling lane 47 to the passing lane 49 is impossible and then returns to step 4.

The passing control unit 11 may determine whether the lane change is possible using additional information from sensors installed in the peripheral monitoring system 21, not illustrated, that monitors rear and side areas of the own vehicle 45.

In step 5, the passing control unit 11 makes the lane change from the traveling lane 47 to the passing lane 49. This process will be described below with reference to FIGS. 5 and 6.

Figure 5:
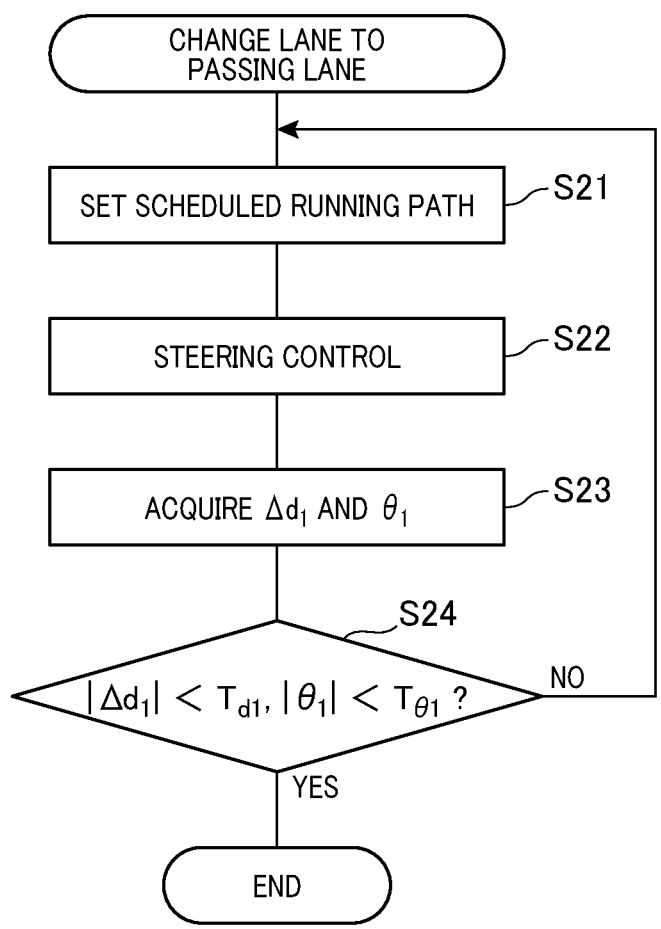
FIG. 5 is a flowchart of a lane change process from a traveling lane to a passing lane.

In step 21 of FIG. 5, the passing control unit 11 sets a scheduled traveling path 50 from the traveling lane 47 to the passing lane 49. FIG. 3 illustrates an example of the scheduled traveling path 50.

In step 22, the passing control unit 11 performs steering control using the steering system 29 such that the own vehicle 45 travels in the scheduled traveling path 50.

Figure 6:
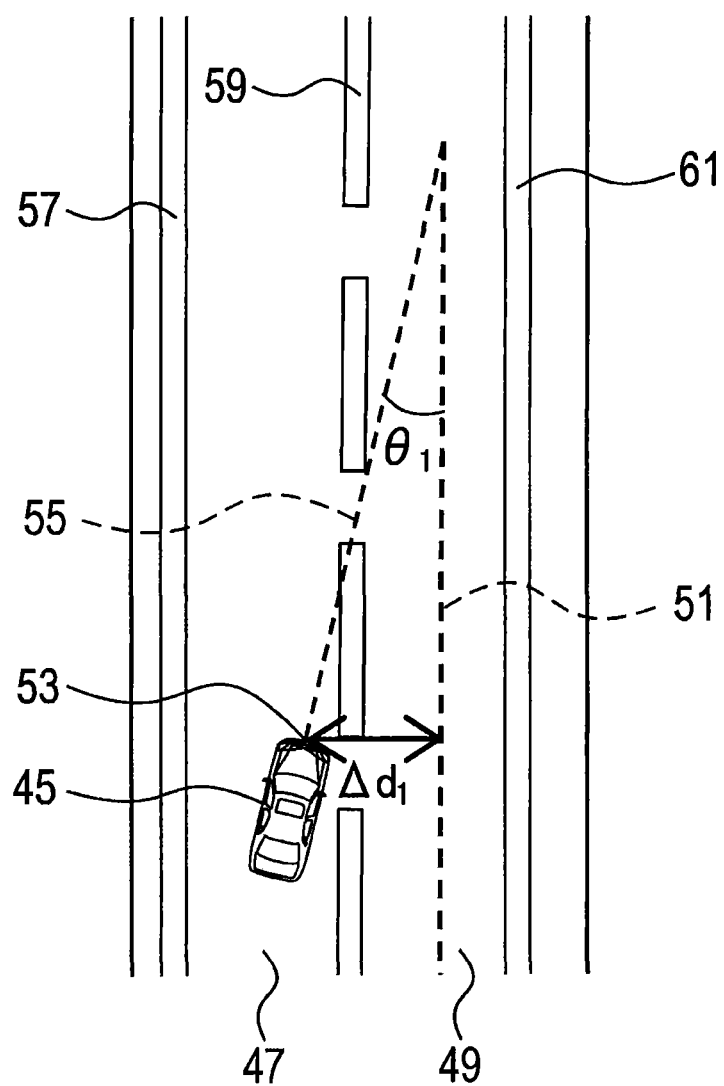
FIG. 6 is an explanatory diagram illustrating $\Delta d_1$ and $\theta_1$.
Figure 7:
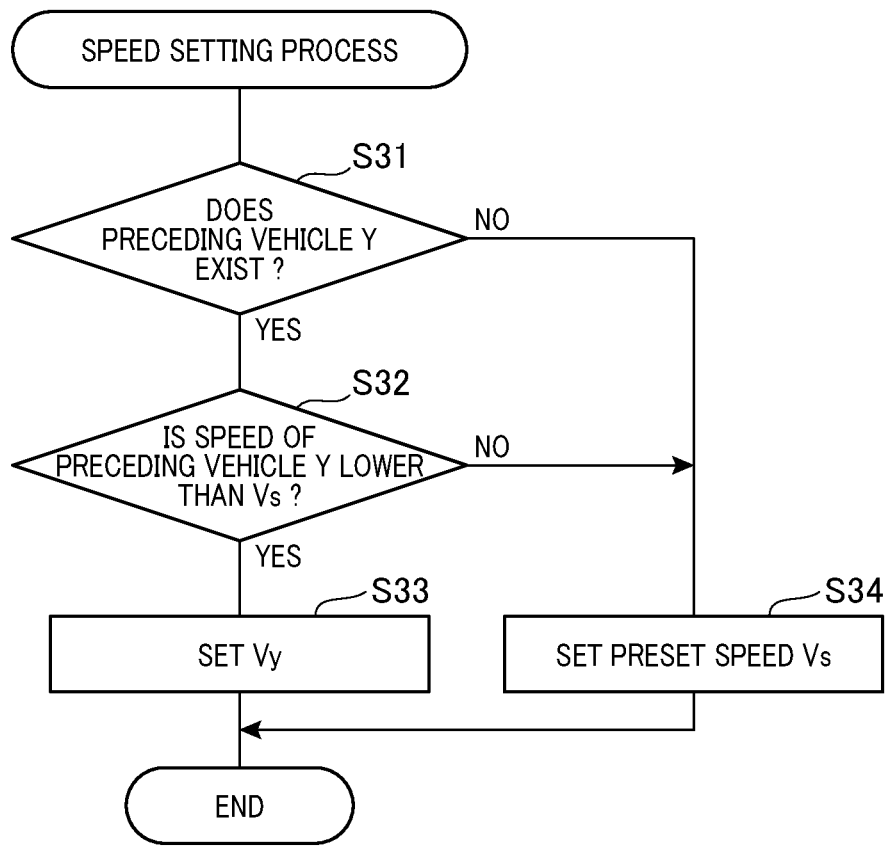
FIG. 7 is a flowchart of a speed setting process.

In step 23, the passing control unit 11 acquires $\Delta d_1$ and $\theta_1$. $\Delta d_1$ represents a lateral distance between a center line 51 in the passing lane 49 and a center 53 of a front end of the own vehicle 45 as seen in a vehicle width direction as illustrated in FIG. 6. The center line 51 is a line that passes through the center of the passing lane 49 as seen in the lateral direction and extends along the traveling direction of the passing lane 49. $\Delta d_1$ takes on a positive value when the center 53 is on the left of the center line 51 or takes on a negative value when the center 53 is on the right of the center line 51 with reference to FIG. 6.

$\theta_1$ represents an angle formed by a longitudinal axis 55 of the own vehicle 45 and the center line 51. The longitudinal axis 55 is a starlight line that passes through the own vehicle 45 in parallel to the longitudinal direction of the own vehicle 45. $\theta_1$ takes on a positive value when the longitudinal axis 55 is on the left of the center line 51 or takes on a negative value when the longitudinal axis 55 is on the right of the center line 51 with reference to FIG. 6.

Positions and orientations of lane boundary lines 57, 59, and 61 in the image acquired using the camera 37 correlate with $\Delta d_1$ and $\theta_1$. The passing control unit 11 acquires $\Delta d_1$ and $\theta_1$ from the positions and orientations of the lane boundary lines 57, 59, and 61 in the image acquired using the camera 37.

In step 24, the passing control unit 11 compares the absolute value of $\Delta d_1$ acquired in step 23 to a preset threshold $T_{d1}$. The passing control unit 11 also compares the absolute value of $\theta_1$ acquired in step 23 to a preset threshold $T_{\theta 1}$.

When the absolute value of $\Delta d_1$ is smaller than the threshold $T_{d1}$ and the absolute value of $\theta_1$ is smaller than the threshold $T_{\theta 1}$, the passing control unit 11 determines that the lane change from the traveling lane 47 to the passing lane 49 has been completed and then terminates the lane change process.

On the other hand, when the absolute value of $\Delta d_1$ is equal to or more than the threshold $T_{d1}$ or the absolute value of $\theta_1$ is equal to or more than the threshold $T_{\theta 1}$, the passing control unit 11 determines that the lane change from the traveling lane 47 to the passing lane 49 has not yet been completed and then returns to step 22.

Returning to FIG. 4, in step 6, the speed setting unit 13 starts a speed setting process to set the speed of the own vehicle 45. The speed setting process will be described with reference to FIG. 7. The speed setting process is repeatedly executed at predetermined time intervals during the own vehicle 45 is traveling in the passing lane 49. In step 31 of FIG. 7, the image captured by the camera 37 or the results of detection by the millimeter-wave sensor 39 are used to determine whether there exists a preceding vehicle Y. The preceding vehicle Y is a vehicle traveling in the passing lane 49 ahead of the own vehicle 45 as illustrated in FIG. 3. When there exists the preceding vehicle Y, the speed setting unit 13 proceeds to step 32, or when there exists no preceding vehicle Y, the speed setting unit 13 proceeds to step 34.

In step 32, the speed setting unit 13 uses the results of detection by the millimeter-wave sensor 39 to acquire speed Vy of the preceding vehicle Y. The speed setting unit 13 then determines whether the speed Vy is lower than a preset speed Vs. When the speed Vy is lower than the preset speed Vs, the speed setting unit 13 proceeds to step 33, or when the speed y is equal to or higher than the preset speed Vs, the speed setting unit 13 proceeds to step 34.

In step 33, the speed Vy is set as the speed of the own vehicle 45. The speed Vy is lower than the preset speed Vs. The passing control unit 11 controls the power train system 25 to run the own vehicle 45 at the speed Vy until execution of the next speed setting process.

In step 34, the preset speed Vs is set as the speed of the own vehicle 45. The passing control unit 11 controls the power train system 25 to run the own vehicle 45 at the preset speed Vs until execution of the next speed setting process.

Returning to FIG. 4, in step 7, the passing control unit 11 uses the image captured by the camera 37 to acquire the position of the other vehicle X traveling in the traveling lane 47. The passing control unit 11 may use the millimeter-wave sensor 39 to acquire the position of the other vehicle X.

The passing control unit 11 uses the position of the other vehicle X acquired as described above to determine whether the own vehicle 45 in the passing lane 49 has already passed the other vehicle X. In this case, passing the other vehicle X by the own vehicle 45 means that the position of the own vehicle 45 as seen in the traveling direction on the road is ahead of the position of the other vehicle X as seen in the traveling direction on the road.

The passing control unit 11 may determine whether the own vehicle 45 has passed the other vehicle X using additional information from the sensors installed in the peripheral monitoring system 21, not illustrated, that monitors the rear and side areas of the own vehicle 45.

When the own vehicle 45 has already passed the other vehicle X, the passing control unit 11 proceeds to step 8, or when the own vehicle 45 has not yet passed the other vehicle X, the passing control unit 11 returns to step 7.

In step 8, the information acquisition unit 19 acquires other vehicle information. The other vehicle information includes Tx, Tx', Tz, and Tz' described below.

Tx represents inter-vehicle time between the own vehicle 45 and the other vehicle X when the own vehicle 45 has passed the other vehicle X.

Tx' represents inter-vehicle time between the other vehicle X and the own vehicle 45 when, assuming that the own vehicle 45 has made a lane change from the passing lane 49 to the traveling lane 47, the lane change has been completed. Tx' is calculated from predicted positions of the other vehicle X and the own vehicle 45 when the lane change has completed. The predicted positions of the other vehicle X and the own vehicle 45 when the lane change has completed are the positions of the other vehicle X and the own vehicle 45 that are traveling at speeds at the time during time Tc taken for the lane change. The time Tc is a preset time.

Tz represents inter-vehicle time between another vehicle Z and the own vehicle 45 at the present time. The other vehicle Z is a vehicle traveling in the traveling lane 47 ahead of the own vehicle 45 and the other vehicle X as illustrated in FIG. 3.

Tz' represents inter-vehicle time between the other vehicle Z and the own vehicle 45 when, assuming that the own vehicle 45 has made a lane change from the passing lane 49 to the traveling lane 47, the lane change has completed. Tz' is calculated from predicted positions of the other vehicle Z and the own vehicle 45 when the lane change has completed. The predicted positions of the other vehicle Z and the own vehicle 45 when the lane change has completed are the positions of the other vehicle Z and the own vehicle 45 that are traveling at speeds at the time during the time Tc taken for the lane change.

The information acquisition unit 19 calculates Tx, Tx', Tz, and Tz' from the positions and speeds of the other vehicle X and the other vehicle Z acquired using the camera 37 or the millimeter-wave sensor 39 and the speed of the own vehicle 45 acquired using the wheel speed sensor 41.

In step 9, the passing control unit 11 determines whether the following equations (1) to (4) satisfy. In the equations (1) to (4), Tx, Tx', Tz, and Tz' take on the values acquired in step 8. The equations (1) to (4) correspond to preset requirements.

$$Tx > Kx \qquad \text{Equation (1)}$$

$$Tx' > Kx' \qquad \text{Equation (2)}$$

$$Tz > Kz \quad \text{Equation (3)}$$

$$Tz' > Kz' \quad \text{Equation (4)}$$

In the equations (1) to (4), Kx, Kx', Kz, and Kz' represent preset thresholds. When all the equations (1) to (4) are satisfied, the passing control unit 11 determines that the lane change from the passing lane 49 to the traveling lane 47 is possible and the process proceeds to step 10. On the other hand, when any one of the equations (1) to (4) does not satisfy, the passing control unit 11 determines that the lane change from the passing lane 49 to the traveling lane 47 is impossible and then returns to step 8.

In step 10, the suspending unit 15 uses the wheel speed sensor 41 to acquire the speed of the own vehicle 45 at that point in time. The speed of the own vehicle 45 is set by the speed setting process started in step 6.

In step 11, the suspending unit 15 determines whether the speed of the own vehicle 45 acquired in step 10 is lower than the preset speed Vs. When the speed of the own vehicle 45 is equal to or higher than the preset speed Vs, the suspending unit 15 proceeds to step 12. On the other hand, when the speed of the own vehicle 45 is lower than the preset speed Vs, the suspending unit 15 proceeds to step 14.

Note that the foregoing determination may be made allowing for a margin. For example, the foregoing determination may be made allowing for hysteresis that is generally used. In this case, chattering in the determination can be suppressed from occurring.

In step 12, the passing control unit 11 makes the lane change from the passing lane 49 to the traveling lane 47. This process will be described with reference to FIGS. 8 and 9. When the lane change is started, the speed setting process started in step 6 is suspended.

Figure 8:
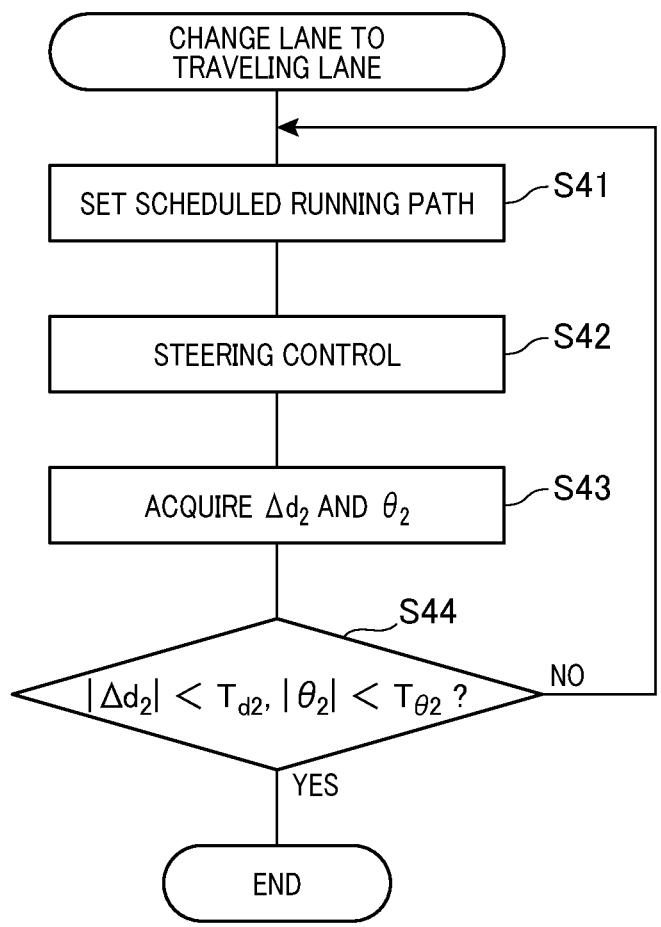
FIG. 8 is a flowchart of a lane change process from the passing lane to the traveling lane.

In step 41 of FIG. 8, the passing control unit 11 sets a scheduled traveling path 63 from the passing lane 49 to the traveling lane 47. FIG. 3 illustrates an example of the scheduled traveling path 63.

In step 42, the passing control unit 11 performs steering control using the steering system 29 so that the own vehicle 45 travels in the scheduled traveling path 63.

Figure 9:
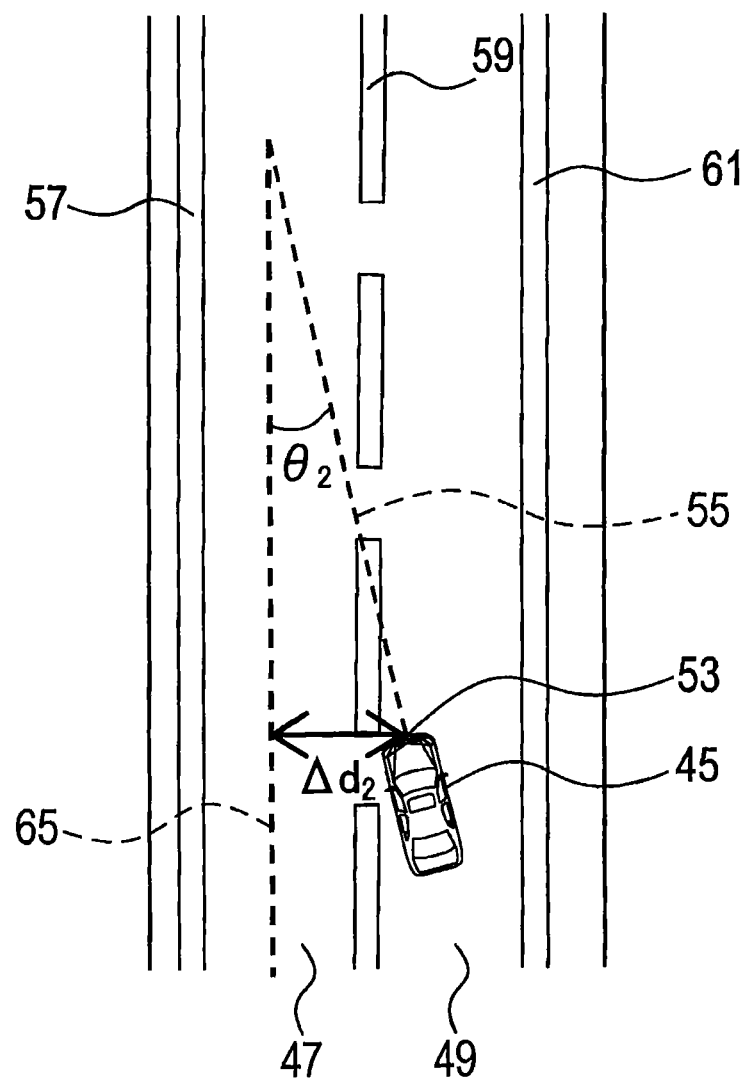
FIG. 9 is an explanatory diagram illustrating $\Delta d_2$ and $\theta_2$.

In step 43, the passing control unit 11 acquires $\Delta d_2$ and $\theta_2$. $\Delta d_2$ represents a lateral distance between a center line 65 in the traveling lane 47 and the center 53 as illustrated in FIG. 9. The center line 65 is a line that passes through the center of the traveling lane 47 as seen in the lateral direction and extends along the traveling direction in the traveling lane 47. $\Delta d_2$ takes on a positive value when the center 53 is on the right of the center line 65 or takes on a negative value when the center 53 is on the left of the center line 65 with reference to FIG. 9.

$\theta_2$ represents an angle formed by the longitudinal axis 55 and the center line 65. $\theta_2$ takes on a positive value when the longitudinal axis 55 is on the right of the center line 65 or takes on a negative value when the longitudinal axis 55 is on the left of the center line 65 with reference to FIG. 9.

The positions and orientations of lane boundary lines 57, 59, and 61 in the image acquired using the camera 37 correlate with $\Delta d_2$ and $\theta_2$. The passing control unit 11 acquires $\Delta d_2$ and $\theta_2$ from the positions and orientations of the lane boundary lines 57, 59, and 61 in the image acquired using the camera 37.

In step 44, the passing control unit 11 compares the absolute value of $\Delta d_2$ acquired in step 43 to a preset threshold $T_{d2}$. The passing control unit 11 also compares the absolute value of $\theta_2$ acquired in step 43 to a preset threshold $T_{\theta 2}$.

When the absolute value of $\Delta_{d2}$ is smaller than the threshold $T_{d2}$ and the absolute value of $\theta_2$ is smaller than the threshold $T_{\theta 2}$, the passing control unit 11 determines that the lane change from the passing lane 49 to the traveling lane 47 has completed and then terminates the process of lane change.

On the other hand, when the absolute value of $\Delta d_2$ is equal to or more than the threshold $T_{d2}$ or the absolute value of $\theta_2$ is equal to or more than the threshold $T_{\theta 2}$, the passing control unit 11 determines that the lane change from the passing lane 49 to the traveling lane 47 has not yet completed and then returns to step 42.

Returning to FIG. 4, in step 13, the speed setting process is started as in step 6 described above. Accordingly, when no preceding vehicle exists in the traveling lane 47 or the speed of the preceding vehicle is equal to or higher than the preset speed Vs, the speed of the own vehicle 45 becomes the preset speed Vs. When a preceding vehicle traveling at a speed lower than Vs in the traveling lane 47 exists, the speed of the own vehicle 45 becomes equal to the speed of the preceding vehicle.

When an affirmative determination is made in step 11, the process proceeds to step 14. In step 14, the notification unit 17 makes a notification using the HMI system 31. The contents of the notification are that the lane change from the passing lane 49 to the traveling lane 47 will not be performed. The passenger in the own vehicle 45 can recognize the notification.

3. Advantageous Effects of the Passing Assist Device 1.

(1A) It is assumed that there is the preceding vehicle Y ahead of the own vehicle 45 in the passing lane 49 and the speed of the preceding vehicle Y is lower than the speed Vs. In this case, the own vehicle 45 changes a lane from the passing lane 49 to the traveling lane 47 and the speed of the own vehicle 45 is set to the preset speed Vs in step 13.

Accordingly, the own vehicle 45 in the traveling lane 47 passes the preceding vehicle Y in the passing lane 49.

When there exists the preceding vehicle Y ahead of the own vehicle 45 in the passing lane 49 and the speed of the preceding vehicle Y is lower than the preset speed Vs, the speed of the own vehicle 45 set by the speed setting process becomes lower than Vs. At that time, the passing assist device 1 suspends the lane change from the passing lane 49 to the traveling lane 47, and thus the own vehicle 45 continues to run in the passing lane 49. As a result, the passing assist device 1 prevents the own vehicle 45 in the traveling lane 47 from passing the preceding vehicle Y in the passing lane 49. It is also possible to reduce the frequency with which the own vehicle 45 changes a lane.

(1B) When suspending the lane change from the passing lane 49 to the traveling lane 47, the passing assist device 1 makes a notification recognizable to the passenger in the own vehicle 45. Accordingly, the passenger can easily understand the situation of the own vehicle 45.

(1C) The passing assist device 1 determines that the lane change from the passing lane 49 to the traveling lane 47 is possible on a necessary condition that all the equations (1) to (4) satisfy. This further improves the safety of the own vehicle 45 in making a lane change.

Other Embodiments

Embodiments for carrying out the present disclosure have been described so far. The present disclosure is not limited to the foregoing embodiments but can be modified in various manners.

(1) The passing assist device 1 may communicate with an infrastructure via the wireless communication system 35 to recognize the lane in which the own vehicle 45 is traveling.

(2) The passing assist device 1 may communicate with another vehicle via the wireless communication system 35 to acquire the position, speed, acceleration rate, vehicle type, traveling lane, and traveling direction of the other vehicle.

(3) Any other condition may be set for determining in step 24 that the lane change from the traveling lane 47 to the passing lane 49 has completed. For example, it may be determined that the lane change from the traveling lane 47 to the passing lane 49 has completed when the absolute value of $\Delta d_1$ is smaller than the threshold $T_{d1}$. Alternatively, it may be determined that the lane change from the traveling lane 47 to the passing lane 49 has completed when the absolute value of $\theta_1$ is smaller than the $T_{\theta1}$.

Any other condition may be set for determining in step 44 that the lane change from the passing lane 49 to the traveling lane 47 has completed. For example, it may be determined that the lane change from the passing lane 49 to the traveling lane 47 has completed when the absolute value of $\Delta d_2$ is smaller than the threshold $T_{d2}$. Alternatively, it may be determined that the lane change from the passing lane 49 to the traveling lane 47 has completed when the absolute value of $\theta_2$ is smaller than the threshold $T_{\theta2}$.

(4) Any other condition may be set for determining in step 9 that the lane change from the passing lane 49 to the traveling lane 47 is possible. For example, it may be determined that the lane change from the passing lane 49 to the traveling lane 47 is possible when one or more selected from among the equations (1) to (4) are satisfied.

Alternatively, it may be determined that the lane change from the passing lane 49 to the traveling lane 47 is possible when the distance between the other vehicle X and the own vehicle 45 and the distance between the other vehicle Z and the own vehicle 45 are equal to or more than respective preset thresholds.

(5) After making the notification in step 14, the passing assist device 1 may terminate the passing assist process.

(6) A plurality of functions of one component in the foregoing embodiments may be implemented by a plurality of components, or one function of one component may be implemented by a plurality of components. In addition, a plurality of functions of a plurality of components may be implemented by one component, or one function implemented by a plurality of components may be implemented by one component. Some of the components in the foregoing embodiment may be omitted. At least some of the components in one of the foregoing embodiment may be added to or replaced by other components in the foregoing other embodiment. All modes included in the technical idea specified only by the text of the claims constitute embodiments of the present disclosure.

(7) The present disclosure can be implemented in various forms including the passing assist device 1 described above, a system including the passing assist device 1, a program for causing a computer to serve as the passing assist device 1, a non-transitory computer readable storage medium such as a semiconductor memory recording this program, a passing assist method, and a traveling assist method.

The invention claimed is:

1. A passing assist device for controlling a subject vehicle to perform a lane change from a traveling lane in which the subject vehicle is traveling, the subject vehicle equipped with an object detection sensor, the device comprising:
a microcomputer comprising a processor, the microcomputer being configured to:
   detect, using the object detection sensor, a first vehicle ahead of the subject vehicle in the traveling lane;
   control a steering system and a power train system of the subject vehicle to change lanes from the traveling lane to a passing lane, pass the first vehicle detected, and change lanes from the passing lane to the traveling lane;
   set a speed of the subject vehicle traveling in the passing lane to a lower one of a preset speed and a speed of a preceding second vehicle in the passing lane; and
   suspend the lane change from the passing lane to the traveling lane in response to the speed of the subject vehicle set being lower than the preset speed while the subject vehicle is traveling in the passing lane.

2. The passing assist device according to claim 1, wherein the microcomputer is further configured to make a notification recognizable to a passenger in the subject vehicle in response to suspending the lane change from the passing lane to the traveling lane.

3. The passing assist device according to claim 1, wherein the microcomputer is further configured to acquire other vehicle information including at least a first inter-vehicle time between the first vehicle passed by the subject vehicle and the subject vehicle and a second inter-vehicle time between a third vehicle ahead of the first vehicle and the subject vehicle in response to the subject vehicle traveling in the passing lane, and
execute the lane change from the passing lane to the traveling lane on a condition that the other vehicle information acquired satisfies a preset requirement.

4. The passing assist device according to claim 3, wherein the preset requirement is a requirement that the first inter-vehicle time and the second inter-vehicle time are greater than respective preset thresholds.

5. The passing assist device according to claim 1, wherein in response to suspending the lane change from the passing lane to the traveling lane, the microcomputer continues the traveling of the subject vehicle in the passing lane.

6. A computer-implemented method for controlling a subject vehicle to perform a lane change from a traveling lane in which the subject vehicle is traveling, the subject vehicle equipped with an object detection sensor, the method comprising:
   detecting, using the object detection sensor and a processor, a first vehicle ahead of the subject vehicle in the traveling lane;
   controlling, using the processor, a steering system and a power train system of the subject vehicle to change lanes from the traveling lane to a passing lane, pass the first vehicle, and change lanes from the passing lane to the traveling lane;
   setting, using the processor, a speed of the subject vehicle traveling in the passing lane to a lower one of a preset speed and a speed of a preceding second vehicle in the passing lane; and
   suspending, using the processor, the lane change from the passing lane to the traveling lane in response to the speed of the subject vehicle being lower than the preset speed while the subject vehicle is traveling in the passing lane.

* * * * *